(12) United States Patent
Zhao et al.

(10) Patent No.: US 11,609,451 B2
(45) Date of Patent: Mar. 21, 2023

(54) DISPLAY DEVICE AND PREPARATION METHOD THEREOF

(71) Applicant: BOE Technology Group Co., Ltd., Beijing (CN)

(72) Inventors: Chengtan Zhao, Beijing (CN); Guangcai Yuan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 56 days.

(21) Appl. No.: 17/260,933

(22) PCT Filed: Mar. 26, 2020

(86) PCT No.: PCT/CN2020/081409
§ 371 (c)(1),
(2) Date: Jan. 15, 2021

(87) PCT Pub. No.: WO2021/189357
PCT Pub. Date: Sep. 30, 2021

(65) Prior Publication Data
US 2022/0137453 A1  May 5, 2022

(51) Int. Cl.
*G02F 1/1335* (2006.01)
(52) U.S. Cl.
CPC .............. *G02F 1/133531* (2021.01)
(58) Field of Classification Search
CPC ................................. G02F 1/133531
See application file for complete search history.

(56) References Cited

U.S. PATENT DOCUMENTS

| 7,952,663 B2 | 5/2011 | Araki et al. |
| 2008/0239210 A1 | 10/2008 | Araki et al. |

(Continued)

FOREIGN PATENT DOCUMENTS

| CN | 101276087 A | 10/2008 |
| CN | 104793281 A | 7/2015 |

(Continued)

OTHER PUBLICATIONS

CN 104793281 A (Ma, Xin-li) translation (Year: 2015).*

(Continued)

*Primary Examiner* — James A Dudek
(74) *Attorney, Agent, or Firm* — Arch & Lake, LLP (57) ABSTRACT

The present disclosure relates to a display device and a preparation method of the display device, and relates to the field of display technology. The display device includes a lower polarizing plate and an upper polarizing plate arranged oppositely, and an embedded polarizing layer located between the lower polarizing plate and the upper polarizing plate. The embedded polarizing layer is located between the lower polarizing plate and the upper polarizing plate, and includes a first orientation layer, a second orientation layer, and a polarizing material layer. The polarizing material layer includes a liquid crystal material. The material layer is arranged between the first orientation layer and the second orientation layer, and is in contact with both the first orientation layer and the second orientation layer. The present disclosure can enhance the contrast of the display device and improve the display effect of the display device.

15 Claims, 5 Drawing Sheets

(56) References Cited

U.S. PATENT DOCUMENTS

2011/0304801 A1* 12/2011 Shibata ............. G02F 1/133528
349/96
2019/0162889 A1* 5/2019 Delbaere ............. G02F 1/13363

FOREIGN PATENT DOCUMENTS

| | | |
|---|---|---|
| CN | 106019449 A | 10/2016 |
| CN | 104793281 B | 2/2019 |
| CN | 110632784 A | 12/2019 |
| WO | 2010089930 A1 | 8/2010 |
| WO | 2010089930 A1 | 12/2019 |

OTHER PUBLICATIONS

Written Opinion issued in PCT/CN2020/081409 dated Jan. 4, 2021, (2p).
International Search Report issued in PCT/CN2020/081409 dated Jan. 4, 2021, (9p).

* cited by examiner

Fig.1

Fig.2 form an embedded polarizing layer on a side of a lower polarizing plate, and the embedded polarizing layer includes a first alignment layer, a second alignment layer and a polarizing material layer, and the polarizing material layer includes a liquid crystal material, and the polarizing material layer is provided between the first alignment layer and the second alignment layer, and is in contact with both the first alignment layer and the second alignment layer ~ S10 install an upper polarizing plate on a side of the embedded polarizing layer away from the lower polarizing plate, and the upper polarizing plate is arranged opposite to the lower polarizing plate ~ S20

Fig.3 form an embedded polarizing layer on a supporting plate ~ S100 provide the supporting plate on the lower polarizing plate, and the embedded polarizing layer is located between the supporting plate and the lower polarizing plate ~ S101

DISPLAY DEVICE AND PREPARATION METHOD THEREOF

CROSS-REFERENCE TO RELATED APPLICATIONS

This application is the national phase application under 35 U.S.C. § 371 of International Patent Application No. PCT/CN2020/081409, filed on Mar. 26, 2020, the entire contents of which are incorporated herein by reference as a part of this application.

TECHNICAL FIELD

The present disclosure relates to the field of display technology, and in particular to a display device and a preparation method of the display device.

BACKGROUND

With the rapid development of display technology, liquid crystal display devices have attracted more and more attention.

In order to improve the display effect of the liquid crystal display device, it is necessary to increase the contrast of the liquid crystal display device. In the prior art, people choose to install an upper polarizing plate and a lower polarizing plate in the liquid crystal display device to improve its contrast. However, the contrast of the liquid crystal display device often fails to reach the expected value, which reduces the display effect of the liquid crystal display device.

It should be noted that the information disclosed in the above background section is only used to strengthen the understanding of the background of the present disclosure, and therefore may include information that does not constitute the prior art known to those of ordinary skill in the art.

SUMMARY

The purpose of the present disclosure is to provide a display device and a preparation method of the display device.

According to an aspect of the present disclosure, there is provided a display device comprising:

a lower polarizing plate and an upper polarizing plate arranged oppositely;

an embedded polarizing layer located between the lower polarizing plate and the upper polarizing plate, and including a first orientation layer, a second orientation layer, and a polarizing material layer, the polarizing material layer including a liquid crystal material, the polarizing material layer being arranged between the first orientation layer and the second orientation layer, and being in contact with both the first orientation layer and the second orientation layer.

In an exemplary embodiment of the present disclosure, the display device further comprises:

a color film substrate provided between the lower polarizing layer and the upper polarizing layer;

a liquid crystal layer located between the color film substrate and the lower polarizing layer, the embedded polarizing layer is located between the color film substrate and the liquid crystal layer.

In an exemplary embodiment of the present disclosure, the embedded polarizing layer is in contact with the liquid crystal layer.

In an exemplary embodiment of the present disclosure, the display device further comprises:

a third orientation layer located between the liquid crystal layer and the embedded polarizing layer, and being in contact with both the liquid crystal layer and the embedded polarizing layer.

In an exemplary embodiment of the present disclosure, an absorption axis of the lower polarizing layer is perpendicular to an absorption axis of the upper polarizing layer, and an absorption axis of the embedded polarizing layer is parallel to the absorption axis of the upper polarizing layer.

In an exemplary embodiment of the present disclosure, the polarizing material layer further includes a dichroic dye.

In an exemplary embodiment of the present disclosure, the material of the first orientation layer and/or the material of the second orientation layer include(s) polyimide.

According to an aspect of the present disclosure, there is provided a preparation method of a display device, comprising:

forming an embedded polarizing layer on a side of a lower polarizing plate, the embedded polarizing layer including a first orientation layer, a second orientation layer, and a polarizing material layer, the polarizing material layer including a liquid crystal material, the polarizing material layer being arranged between the first orientation layer and the second orientation layer, and being in contact with both the first orientation layer and the second orientation layer;

installing an upper polarizing plate on a side of the embedded polarizing layer away from the lower polarizing plate, and the upper polarizing plate being arranged opposite to the lower polarizing plate.

In an exemplary embodiment of the present disclosure, forming an embedded polarizing layer on a side of a lower polarizing plate includes:

forming an embedded polarizing layer on a supporting plate;

providing the supporting plate on the lower polarizing plate, and the embedded polarizing layer being located between the supporting plate and the lower polarizing plate.

In an exemplary embodiment of the present disclosure, forming an embedded polarizing layer on a supporting plate includes:

forming a first orientation layer on a supporting plate;

forming a precursor material layer on a side of the first orientation layer away from the supporting plate, and the precursor material layer being in contact with the first orientation layer;

forming a second orientation layer on a side of the precursor material layer away from the first orientation layer, and the second orientation layer being in contact with the precursor material layer;

curing the precursor material layer to form the polarizing material layer.

In an exemplary embodiment of the present disclosure, forming a second orientation layer on a side of the precursor material layer away from the first orientation layer includes:

forming a second orientation layer on a carrier;

providing the carrier on the precursor material layer, wherein the second orientation layer is located between the carrier and the precursor material layer and is in contact with the precursor material layer;

removing the carrier.

In an exemplary embodiment of the present disclosure, forming a second orientation layer on a carrier includes:

forming a peeling layer on a carrier;

forming a second orientation layer on a side of the peeling layer away from the carrier.

In an exemplary embodiment of the present disclosure, the supporting plate is a color film substrate, and the color film substrate includes a base substrate and a color film layer provided on a side of the base substrate, and forming an embedded polarizing layer on a supporting plate includes:

forming an embedded polarizing layer on a side of the color film layer away from the base substrate;

providing the supporting plate on the lower polarizing plate includes:

forming an array substrate on the lower polarizing plate;

aligning the color film substrate with the array substrate, and the embedded polarizing layer being located on a side of the color film substrate facing the array substrate;

the preparation method of a display device further includes:

filling a liquid crystal layer between the array substrate and the embedded polarizing layer.

In an exemplary embodiment of the present disclosure, the liquid crystal layer is in contact with the embedded polarizing layer.

In an exemplary embodiment of the present disclosure, after forming an embedded polarizing layer on a side of the color film layer away from the base substrate, the preparation method of a display device further comprises:

forming a third orientation layer on a side of the embedded polarizing layer away from the color film substrate, and the third orientation layer being in contact with the embedded polarizing layer;

filling a liquid crystal layer between the array substrate and the embedded polarizing layer includes:

filling a liquid crystal layer between the array substrate and the third orientation layer, and the liquid crystal layer being in contact with the third orientation layer.

In the display device and the preparation method of the display device of the present disclosure, the polarizing material layer includes the liquid crystal material, and because the polarizing material layer is disposed between the first orientation layer and the second orientation layer, and is connected to the first orientation layer and the second orientation layer, so that the orientation of the polarizing material layer is better, the polarization performance of the polarizing material layer is improved, the contrast of the display device is enhanced, and the display effect of the display device is improved.

Other characteristics and advantages of the present disclosure will become apparent through the following detailed description, or partly learned through the practice of the present disclosure.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the disclosure, and are used together with the specification to explain the principle of the disclosure. Obviously, the drawings in the following description are only some embodiments of the present disclosure. For those of ordinary skill in the art, other drawings can be obtained based on these drawings without creative work.

DETAILED DESCRIPTION

Exemplary embodiments will now be described more fully with reference to the accompanying drawings. However, the exemplary embodiments can be implemented in various forms, and should not be construed as being limited to the examples set forth herein; on the contrary, the provision of these embodiments makes the present disclosure more comprehensive and complete, and fully conveys the concept of the exemplary embodiments to those skilled in the art. The described features, structures or characteristics may be combined in one or more embodiments in any suitable way. In the following description, many specific details are provided to give a sufficient understanding of the embodiments of the present disclosure. However, those skilled in the art will realize that the technical solutions of the present disclosure can be practiced without one or more of the specific details, or other methods, components, devices, steps, etc. can be used. In other cases, the well-known technical solutions are not shown or described in detail to avoid overwhelming the crowd and obscure all aspects of the present disclosure.

In addition, the drawings are only schematic illustrations of the present disclosure, and are not necessarily drawn to scale. The same reference numerals in the figures indicate the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

The terms "a", "a", "the" and "said" are used to indicate the presence of one or more elements/components/etc.; the terms "comprising" and "having" are used to indicate open-ended inclusion means and means that there may be other elements/components/etc. besides the listed elements/components/etc.; the terms "first" and "second" etc. are only used as marks, not the quantity of their objects limit.

Figure 1:
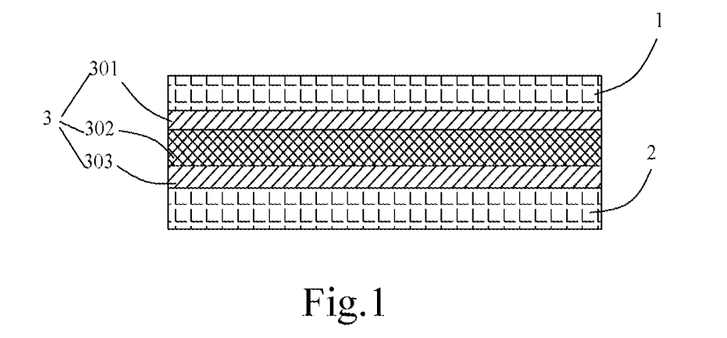
FIG. 1 schematically shows a schematic diagram of a display device in an exemplary embodiment of the present disclosure.

This exemplary embodiment first proposes a display device, as shown in FIG. 1, its advantages and positive effects are:

The display device may comprise a lower polarizing plate 2, an upper polarizing plate 1 and an embedded polarizing layer 3. The lower polarizing plate 2 and the upper polarizing plate 1 are arranged oppositely. The embedded polarizing layer 3 is located between the lower polarizing plate 2 and the upper polarizing plate 1, and includes a first orientation layer 301, a second orientation layer 303 and a polarizing material layer 302. The polarizing material layer 302 includes a liquid crystal material. The polarizing material layer 302 is disposed between the first orientation layer 301 and the second orientation layer 303, and is in contact with both the first orientation layer 301 and the second orientation layer 303.

In the display device of this exemplary embodiment, the polarizing material layer 302 includes the liquid crystal material, and because the polarizing material layer 302 is disposed between the first orientation layer 301 and the second orientation layer 303, and is in contact with both the first orientation layer 301 and the second orientation layer 303, so that the orientation of the polarizing material layer 302 is better, and the polarization performance of the polarizing material layer 302 is improved, thereby enhancing the contrast of the display device and improving the display effect of the display device.

Hereinafter, the display device in this exemplary embodiment will be further described.

Referring to FIG. 1, the display device in this exemplary embodiment may be a liquid crystal display device. The upper polarizing plate 1 is an Up POL in the liquid crystal display device. The lower polarizing layer 2 is a Down POL in the liquid crystal display device. An absorption axis of the lower polarizing layer 2 is perpendicular to an absorption axis of the upper polarizing layer 1. The embedded polarizing layer 3 is located between the upper polarizing plate 1 and the lower polarizing plate 2. The first orientation layer 301 may be located between the polarizing material layer 302 and the upper polarizing layer 1, and the second orientation layer 303 is located between the polarizing material layer 302 and the lower polarizing layer 2. The polarizing material layer 302 may include a host material and a doping material. The host material is a liquid crystal material. The doping material may be a dichroic dye, but this exemplary embodiment does not specifically limit this. The thickness of the polarizing material layer 302 may be 2-10 μm, for example, 2 μm, 5 μm, 8 μm, 10 μm, etc. The material of the first orientation layer 301 and/or the material of the second orientation layer 303 may include polyimide, but this exemplary embodiment is not limited thereto. The thickness of the first orientation layer 301 and/or the second orientation layer 303 is less than 1 μm, such as 0.8 μm, 0.7 μm, 0.6 μm, etc. In addition, an absorption axis of the embedded polarizing layer 3 is parallel to the absorption axis of the upper polarizing layer 1.

Figure 2:
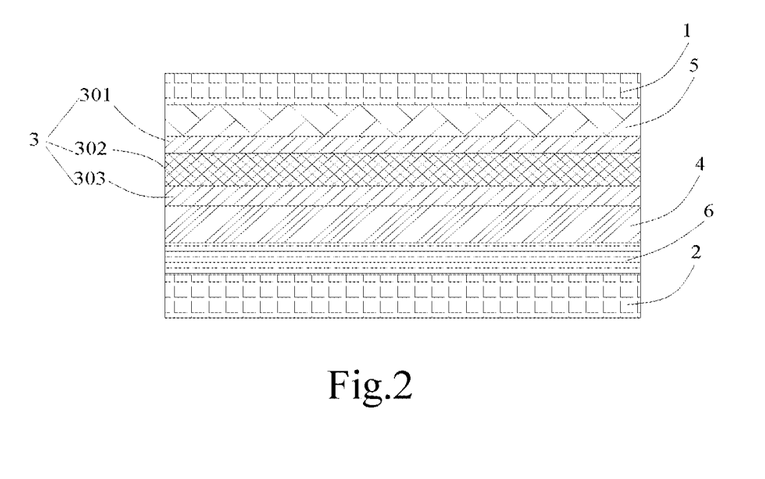
FIG. 2 schematically shows another schematic diagram of the display device in an exemplary embodiment of the present disclosure.

Referring to FIG. 2, the display device may further comprise a color film substrate 5 and a liquid crystal layer 4. The color film substrate 5 may include a base substrate and a color film layer provided on the base substrate. The color film substrate 5 can be arranged between the lower polarizing plate 2 and the upper polarizing plate 1. The liquid crystal layer 4 may be located between the color film substrate 5 and the lower polarizing layer 2. Wherein the liquid crystal layer 4 faces the color film layer of the color film substrate 5. Of course, a side of the liquid crystal layer 4 facing the color film substrate 5 may also be provided with a third orientation layer, and the third orientation layer is in contact with the liquid crystal layer 4. The display device may further comprise an array substrate 6. The array substrate 6 may be located between the liquid crystal layer 4 and the lower polarizing plate 2. The number of the embedded polarizing layer 3 may be one, two, three, or more. As an example, the number of the embedded polarizing layer 3 is one, and the embedded polarizing layer 3 may be located between the color film substrate 5 and the liquid crystal layer 4. Of course, the embedded polarizing layer 3 may also be located between the color film substrate 5 and the upper polarizing plate 1, but not limited to this. The embedded polarizing layer 3 may also be located between the liquid crystal layer 4 and the lower polarizing plate 2. Taking that the embedded polarizing layer 3 is located between the color film substrate 5 and the liquid crystal layer 4 as an example, the embedded polarizing layer 3 may be in contact with the liquid crystal layer 4. Of course, a third orientation layer may also be provided between the embedded polarizing layer 3 and the liquid crystal layer 4, and is in contact with both the embedded polarizing layer 3 and the liquid crystal layer 4. Since the distance between the liquid crystal layer 4 and the embedded polarizing layer 3 is relatively short, light passing through the liquid crystal layer 4 can quickly enter the embedded polarizing layer 3 to solve the problem of poor polarization of light caused by the depolarization of the liquid crystal layer 4. Taking that the embedded polarizing layer 3 is located between the color film substrate 5 and the upper polarizing plate 1 as an example, the embedded polarizing layer 3 may be in contact with the color film substrate 5 so that light passing through the color film substrate 5 can directly enter the embedded polarizing layer 3 to solve the problem of poor polarization of light caused by the depolarization of the color film substrate 5. Taking that the embedded polarizing layer 3 is located between the liquid crystal layer 4 and the lower polarizing plate 2 and the display device comprises the array substrate 6 as an example, the embedded polarizing layer 3 may be located between the array substrate 6 and the liquid crystal layer 4. Taking that the number of the embedded polarizing layer 3 is two as an example, one embedded polarizing layer 3 is located between the color film substrate 5 and the liquid crystal layer 4, and the other embedded polarizing layer 3 is located between the color film substrate 5 and the upper polarizing plate 1.

Figure 3:
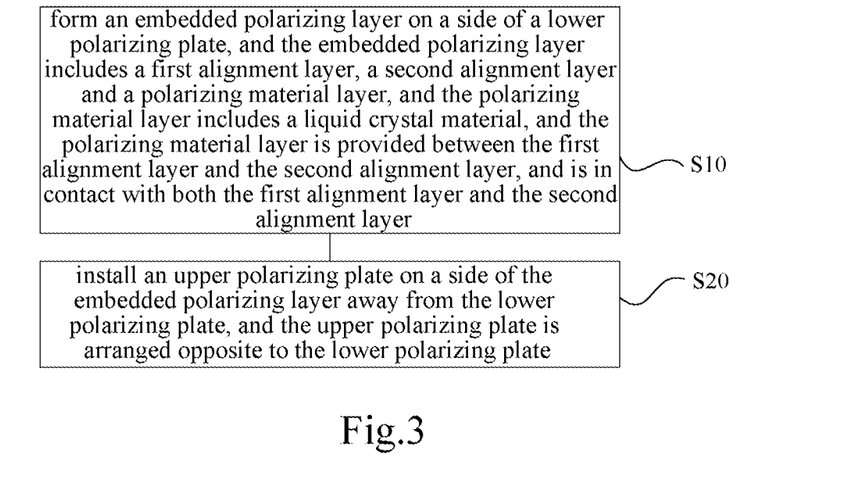
FIG. 3 schematically shows a flow chart of a preparation method of the display device in an exemplary embodiment of the present disclosure.

This exemplary embodiment also provides a preparation method of a display device, which is used to prepare the display device described in any of the foregoing embodiments. Referring to FIG. 3, the preparation method of the display device may include step S10 and step S20, wherein:

In Step S10, an embedded polarizing layer on a side of a lower polarizing plate is formed, and the embedded polarizing layer includes a first orientation layer, a second orientation layer and a polarizing material layer, and the polarizing material layer includes a liquid crystal material, and the polarizing material layer is provided between the first orientation layer and the second orientation layer, and is in contact with both the first orientation layer and the second orientation layer.

In step S20, an upper polarizing plate is installed on a side of the embedded polarizing layer away from the lower polarizing plate, and the upper polarizing plate is arranged opposite to the lower polarizing plate.

The display device prepared by the preparation method of the display device of this exemplary embodiment is the same as the display device in the above-mentioned display device embodiment, and therefore, it has the same effective effect, which will not be repeated here.

Hereinafter, each part of the preparation method of the display device of this exemplary embodiment will be described in detail:

In step S10, an embedded polarizing layer on a side of a lower polarizing plate is formed, and the embedded polarizing layer includes a first orientation layer, a second orientation layer and a polarizing material layer, and the polarizing material layer includes a liquid crystal material, and the polarizing material layer is arranged between the first orientation layer and the second orientation layer, and is in contact with both the first orientation layer and the second orientation layer.

Figure 4:
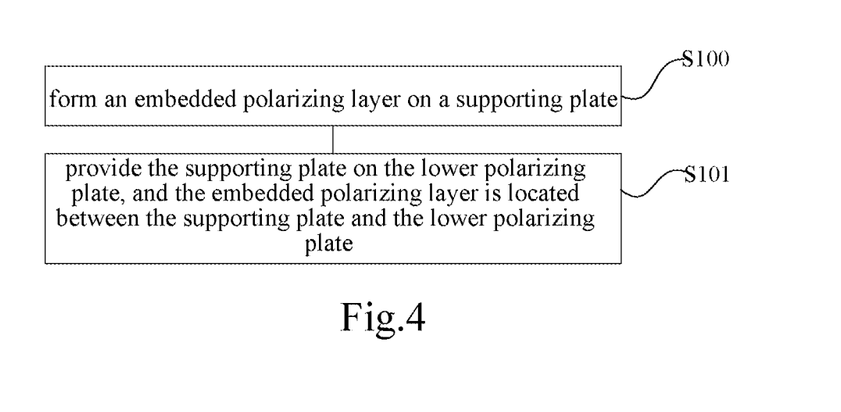
FIG. 4 schematically shows a flowchart of step S10 in the preparation method of the display device in an exemplary embodiment of the present disclosure.
Figure 5:
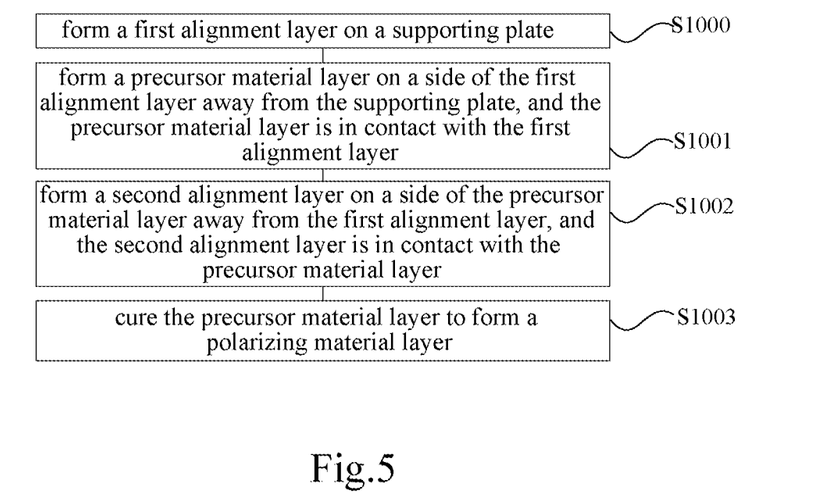
FIG. 5 schematically shows a flowchart of step S100 in the preparation method of the display device in an exemplary embodiment of the present disclosure.

For example, referring to FIG. 4, step S10 may include step S100 and step S101, where:

In step S100, an embedded polarizing layer on a supporting plate is formed.

Wherein referring to FIG. 5, step S100 may include:

Step S1000, form a first orientation layer on a supporting plate.

Figure 6:
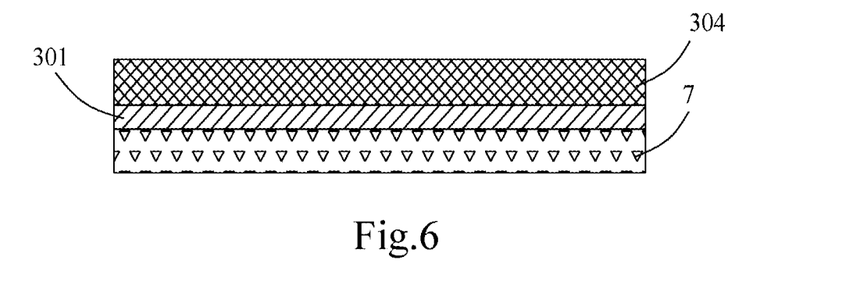
FIG. 6 schematically shows a schematic diagram after completion of step S1001 in the preparation method of the display device in an exemplary embodiment of the present disclosure.

Referring to FIG. 6, the material of the first orientation layer 301 formed on the supporting plate 7 may include polyimide, but this exemplary embodiment does not specifically limit this. The first orientation layer 301 may be prepared by a rubbing orientation process, but this exemplary embodiment is not limited thereto.

Step S1001, form a precursor material layer on a side of the first orientation layer away from the supporting plate, and the precursor material layer is in contact with the first orientation layer.

As shown in FIG. 6, the precursor material layer 304 may include a host material and a dopant material. The host material is a liquid crystal material. The doping material may be a dichroic dye, but this exemplary embodiment does not specifically limit this. The precursor material layer 304 may also include a cured material. The curing material may be an ultraviolet light curing material. Under ultraviolet light irradiation, the ultraviolet light curing material can be cured, so that the precursor material layer 304 can be cured into a film to form the polarizing material layer 302. The precursor material layer 304 can be prepared by a spin coating process, of course, it can also be prepared by other methods, and this exemplary embodiment will not be described in detail here.

Figure 7:
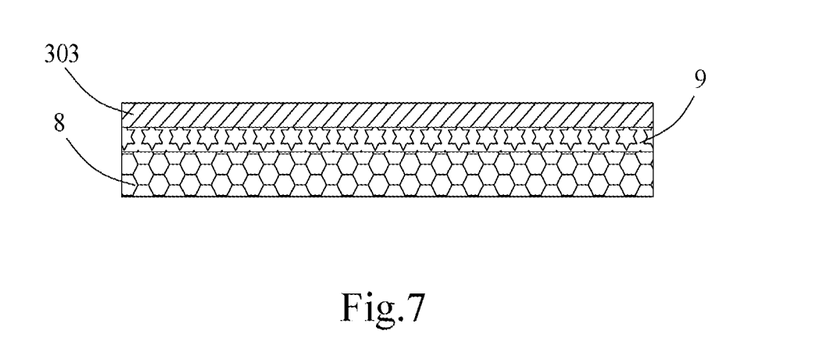
FIG. 7 schematically shows a schematic diagram after forming a second orientation layer on a carrier in step S1002 of the preparation method of the display device in an exemplary embodiment of the present disclosure.
Figure 8:
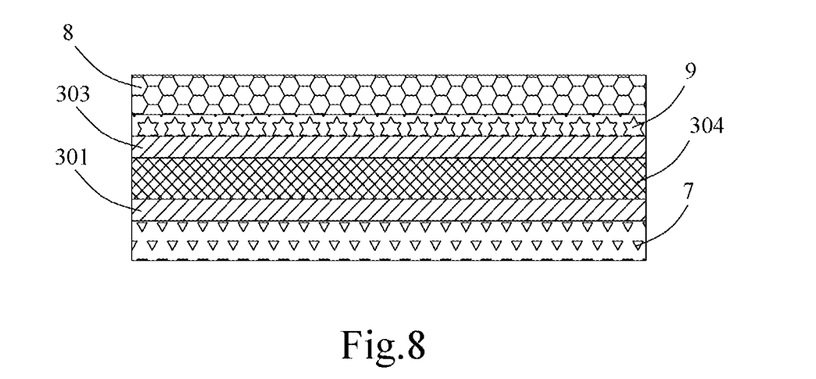
FIG. 8 schematically shows a schematic diagram after providing the carrier on a precursor material layer in step S1002 in the preparation method of the display device in the exemplary embodiment of the present disclosure.

In step S1002, a second orientation layer is formed on a side of the precursor material layer away from the first orientation layer, and the second orientation layer is in contact with the precursor material layer.

Wherein as shown in FIGS. 7 and 8, step S1002 may include: forming a second orientation layer 303 on a carrier 8; providing the carrier 8 on the precursor material layer 304, wherein the second orientation layer 303 is located on the carrier 8 and the precursor material layer 304, and is in contact with the precursor material layer 304; removing the carrier 8. The material of the second orientation layer 303 may include polyimide, but this exemplary embodiment does not specifically limit this. The second orientation layer 303 may be prepared by a rubbing orientation process, but this exemplary embodiment is not limited thereto. The carrier 8 may be a glass plate. Forming of the second orientation layer 303 on a carrier 8 in step S1002 may include: forming a peeling layer 9 on a carrier 8; forming a second orientation layer 303 on a side of the peeling layer 9 away from the carrier 8. Wherein the carrier 8 can be easily removed via the peeling layer 9.

In Step S1003, the precursor material layer is cured to form a polarizing material layer.

Taking that the precursor material layer including an ultraviolet curing material as an example, in this exemplary embodiment, ultraviolet light may be used to irradiate the precursor material layer to cure the precursor material layer to form the polarizing material layer. Among them, by adjusting the polarization direction of the ultraviolet light, the direction of the absorption axis of the embedded polarizing layer can be adjusted.

The aforementioned supporting plate may be a color film substrate. The color film substrate includes a base substrate and a color film layer arranged on a side of the base substrate. In other embodiments of the present disclosure, taking that the supporting plate is a color film substrate as an example, step S100 may include: forming an embedded polarizing layer on a side of the color film layer away from the base substrate. Wherein, the color film substrate may further include a protective layer covering the color film layer and the base substrate. The embedded polarizing layer may be formed on the protective layer. In addition, after forming the embedded polarizing layer on the side of the color film layer away from the base substrate, the preparation method of the display device of the present disclosure may further comprise: forming a third orientation layer on a side of the embedded polarizing layer away from the color film substrate, the third orientation layer being in contact with the embedded polarizing layer.

Figure 9:
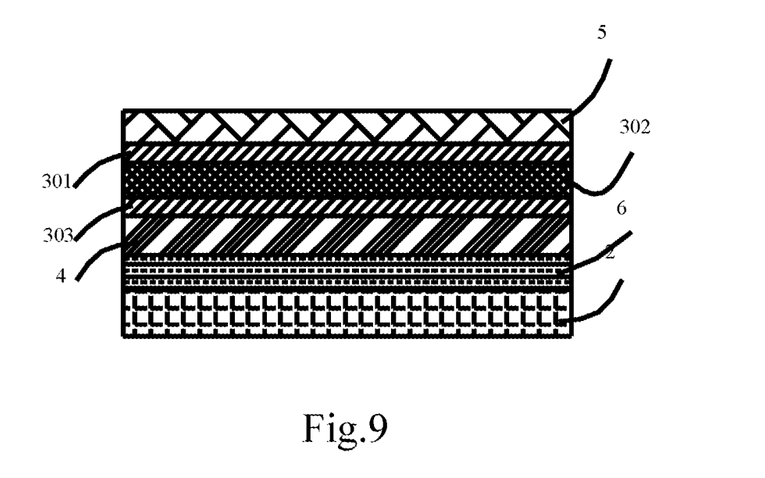
FIG. 9 schematically shows a schematic diagram after completion of step S101 in the preparation method of the display device in an exemplary embodiment of the present disclosure.

Step S101: provide the supporting plate on the lower polarizing plate, and the embedded polarizing layer is located between the supporting plate and the lower polarizing plate.

The supporting plate can be an auxiliary plate, and the supporting plate may be removed after the embedded polarizing layer is arranged on the lower polarizing plate with the supporting plate. Of course, the supporting plate may also be the above-mentioned color film substrate, etc., so that the operation of "removing the supporting plate" is not required in this exemplary embodiment. As shown in FIG. 9, taking that the supporting plate is the color film substrate 5 as an example, arranging the supporting plate on the lower polarizing plate 2 may include: forming an array substrate 6 on the lower polarizing plate 2; and aligning the color film substrate 5 with the array substrate 6, and the embedded polarizing layer 3 being located on a side of the color film substrate 5 facing the array substrate 6. Further, the preparation method of the display device of the present disclosure may further comprise: filling a liquid crystal layer 4 between the array substrate 6 and the embedded polarizing layer 3. Wherein a third orientation layer may be formed on a side of the embedded polarizing layer 3 away from the color film substrate 5, and the embedded polarizing layer 3 may be in contact with the third orientation layer; if the third orientation layer is not formed on the side of the embedded polarizing layer 3 away from the color film substrate 5, the embedded polarizing layer 3 may be in contact with the liquid crystal layer 4.

Figure 10:
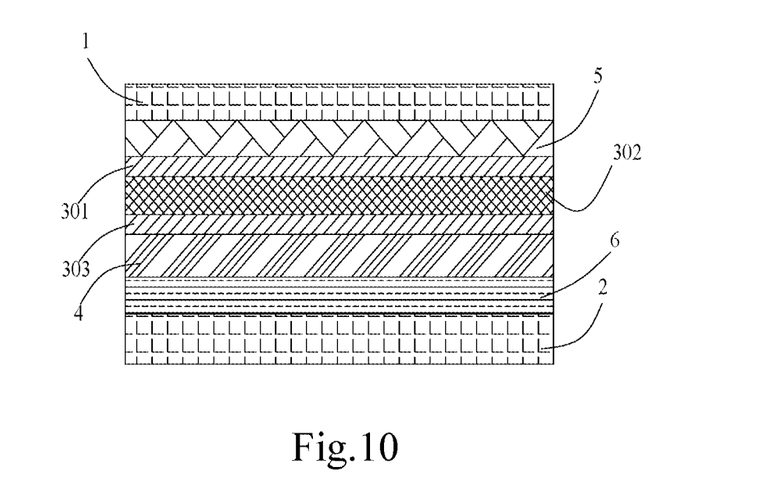
FIG. 10 schematically shows a schematic diagram after completion of step S20 in the preparation method of the display device in an exemplary embodiment of the present disclosure.

In step S20, an upper polarizing plate is installed on a side of the embedded polarizing layer away from the lower polarizing plate, and the upper polarizing plate is disposed opposite to the lower polarizing plate.

As shown in FIG. 10, taking that the supporting plate is the color film substrate 5 as an example, step S20 may include: installing an upper polarizing layer 1 on a side of the embedded polarizing layer 3 away from the color film substrate 5, and the upper polarizing plate 1 being arranged opposite to the lower polarizing plate 2.

In other embodiments of this example, forming an embedded polarizing layer on a side of a lower polarizing layer may include: forming a second orientation layer on a side of the lower polarizing layer; forming a precursor material layer on a side of the second orientation layer away from the lower polarizing layer, and the precursor material layer being in contact with the second orientation layer; forming a first orientation layer on a side of the precursor material layer away from the second orientation layer, and the first orientation layer being in contact with the precursor material layer; curing the precursor material layer to form a polarizing material layer. Wherein forming a first orientation layer on a side of the precursor material layer away from the second orientation layer may include: forming a first orientation layer on a substrate; providing the substrate on the precursor material layer, wherein the first orientation layer is located between the substrate and the precursor material layer and is in contact with the precursor material layer; removing the substrate. In the above steps, forming a first orientation layer on a substrate may include: forming a peeling layer on a substrate; and forming a first orientation layer on a side of the peeling layer away from the substrate. Wherein the second orientation layer may be formed on a color film substrate. Specifically, forming a second orientation layer on a side of the lower polarizing layer may include: forming a color film substrate on a side of the lower polarizing layer; and forming a second orientation layer on a side of the color film substrate away from the lower polarizing layer. The second orientation layer may be in contact with the color film substrate. Of course, the second orientation layer may also be formed on an array substrate. Specifically, forming a second orientation layer on a side of the lower polarizing layer may include: forming an array substrate on a side of the lower polarizing layer; and forming a second orientation layer on a side of the array substrate away from the lower polarizing layer.

In addition, although the various steps of the method in the present disclosure are described in a specific order in the drawings, this does not require or imply that these steps must be performed in the specific order, or that all the steps shown must be performed to achieve the desired result. Additionally or alternatively, some steps may be omitted, multiple steps may be combined into one step for execution, and/or one step may be decomposed into multiple steps for execution, etc.

Those skilled in the art will easily think of other embodiments of the present disclosure after considering the specification and practicing the disclosure disclosed herein. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the appended claims.

What is claimed is:

1. A display device comprising:
    a lower polarizing plate and an upper polarizing plate arranged oppositely;
    an embedded polarizing layer located between the lower polarizing plate and the upper polarizing plate, and including:
    a first orientation layer;
    a second orientation layer; and
    a polarizing material layer including a host material and a dopant material,
    wherein the host material is a liquid crystal material and the doping material is a dichroic dye,
    wherein the polarizing material layer is arranged between the first orientation layer and the second orientation layer, and is in contact with both the first orientation layer and the second orientation layer,
    wherein the display device further comprises:
    a color film substrate provided between the lower polarizing layer and the upper polarizing layer;
    a liquid crystal layer located between the color film substrate and the lower polarizing layer,
    wherein the embedded polarizing layer is located between the color film substrate and the liquid crystal layer,
    wherein the display device further comprises:
    a third orientation layer located between the liquid crystal layer and the embedded polarizing layer, and being in contact with both the liquid crystal layer and the embedded polarizing layer,
    wherein an absorption axis of the embedded polarizing layer is parallel to the absorption axis of the upper polarizing layer,
    wherein the number of the embedded polarizing layer is two, one embedded polarizing layer is located between the color film substrate and the liquid crystal layer, and the other embedded polarizing layer is located between the color film substrate and the upper polarizing plate.

2. The display device of claim 1, wherein the embedded polarizing layer is in contact with the liquid crystal layer.

3. The display device of claim 1, wherein an absorption axis of the lower polarizing layer is perpendicular to an absorption axis of the upper polarizing layer.

4. The display device according to claim 1, wherein the material of the first orientation layer and/or the material of the second orientation layer include(s) polyimide.

5. A preparation method of a display device, comprising:
    forming an embedded polarizing layer on a side of a lower polarizing plate, the embedded polarizing layer including a first orientation layer, a second orientation layer and a polarizing material layer, the polarizing material layer including a host material and a dopant material, wherein the host material is a liquid crystal material and the doping material is a dichroic dye, the polarizing material layer being arranged between the first orientation layer and the second orientation layer, and being in contact with both the first orientation layer and the second orientation layer; and
    installing an upper polarizing plate on a side of the embedded polarizing layer away from the lower polarizing plate, and the upper polarizing plate being arranged opposite to the lower polarizing plate,
    wherein forming an embedded polarizing layer on a side of a lower polarizing plate includes:
    forming an embedded polarizing layer on a supporting plate;
    providing the supporting plate on the lower polarizing plate, and the embedded polarizing layer being located between the supporting plate and the lower polarizing plate,
    wherein the supporting plate is a color film substrate, and the color film substrate includes a base substrate and a color film layer provided on a side of the base substrate, forming an embedded polarizing layer on a supporting plate includes forming an embedded polarizing layer on a side of the color film layer away from the base substrate;

providing the supporting plate on the lower polarizing plate includes:

forming an array substrate on the lower polarizing plate;

aligning the color film substrate with the array substrate, and the embedded polarizing layer is located on a side of the color film substrate facing the array substrate; and the preparation method of a display device further comprises:

filling a liquid crystal layer between the array substrate and the embedded polarizing layer, wherein after forming an embedded polarizing layer on a side of the color film layer away from the base substrate, the preparation method of a display device further comprises:

forming a third orientation layer on a side of the embedded polarizing layer away from the color film substrate, and the third orientation layer is in contact with the embedded polarizing layer, wherein an absorption axis of the embedded polarizing layer is parallel to the absorption axis of the upper polarizing layer, wherein the number of the embedded polarizing layer is two, one embedded polarizing layer is located between the color film substrate and the liquid crystal layer, and the other embedded polarizing layer is located between the color film substrate and the upper polarizing plate.

6. The preparation method of a display device according to claim 5, wherein forming an embedded polarizing layer on a supporting plate includes:

forming a first orientation layer on a supporting plate;

forming a precursor material layer on a side of the first orientation layer away from the supporting plate, and the precursor material layer being in contact with the first orientation layer;

forming a second orientation layer on a side of the precursor material layer away from the first orientation layer, and the second orientation layer being in contact with the precursor material layer;

curing the precursor material layer to form the polarizing material layer.

7. The preparation method of a display device according to claim 6, wherein forming a second orientation layer on a side of the precursor material layer away from the first orientation layer includes:

forming a second orientation layer on a carrier;

providing the carrier on the precursor material layer, wherein the second orientation layer is located between the carrier and the precursor material layer and is in contact with the precursor material layer; and removing the carrier.

8. The preparation method of a display device according to claim 7, wherein forming a second orientation layer on a carrier includes:

forming a peeling layer on a carrier; and forming a second orientation layer on a side of the peeling layer away from the carrier.

9. The preparation method of a display device according to claim 5, wherein the liquid crystal layer is in contact with the embedded polarizing layer.

10. The preparation method of a display device according to claim 5, wherein after forming an embedded polarizing layer on a side of the color film layer away from the base substrate, the preparation method of a display device further comprises:

wherein filling a liquid crystal layer between the array substrate and the embedded polarizing layer includes filling a liquid crystal layer between the array substrate and the third orientation layer, and the liquid crystal layer is in contact with the third orientation layer.

11. The preparation method of a display device according to claim 5, wherein a thickness of the polarizing material layer is 2-10 μm, and a thickness of the first orientation layer and/or the second orientation layer is less than 1 μm.

12. A display device comprising:

a lower polarizing plate and an upper polarizing plate arranged oppositely;

an embedded polarizing layer located between the lower polarizing plate and the upper polarizing plate, and including:

a first orientation layer;

a second orientation layer; and a polarizing material layer including a host material and a dopant material, wherein the host material is a liquid crystal material and the doping material is a dichroic dye, wherein the polarizing material layer is arranged between the first orientation layer and the second orientation layer, and is in contact with both the first orientation layer and the second orientation layer, wherein the display device further comprises:

a color film substrate provided between the lower polarizing layer and the upper polarizing layer;

a liquid crystal layer located between the color film substrate and the lower polarizing layer, wherein the embedded polarizing layer is located between the color film substrate and the liquid crystal layer, wherein the display device further comprises:

a third orientation layer located between the liquid crystal layer and the embedded polarizing layer, and being in contact with both the liquid crystal layer and the embedded polarizing layer, wherein an absorption axis of the embedded polarizing layer is parallel to the absorption axis of the upper polarizing layer, wherein a thickness of the polarizing material layer is 2-10 μm, and a thickness of the first orientation layer and/or the second orientation layer is less than 1 μm.

13. The display device of claim 12, wherein the embedded polarizing layer is in contact with the liquid crystal layer.

14. The display device of claim 12, wherein an absorption axis of the lower polarizing layer is perpendicular to an absorption axis of the upper polarizing layer.

15. The display device according to claim 12, wherein the material of the first orientation layer and/or the material of the second orientation layer include(s) polyimide.

* * * * *